G. F. REBER.
VEHICLE WHEEL.
APPLICATION FILED JUNE 19, 1914.

1,129,729.

Patented Feb. 23, 1915.
2 SHEETS—SHEET 1.

Witnesses
Inventor
G. F. Reber,
By Victor J. Evans
Attorney

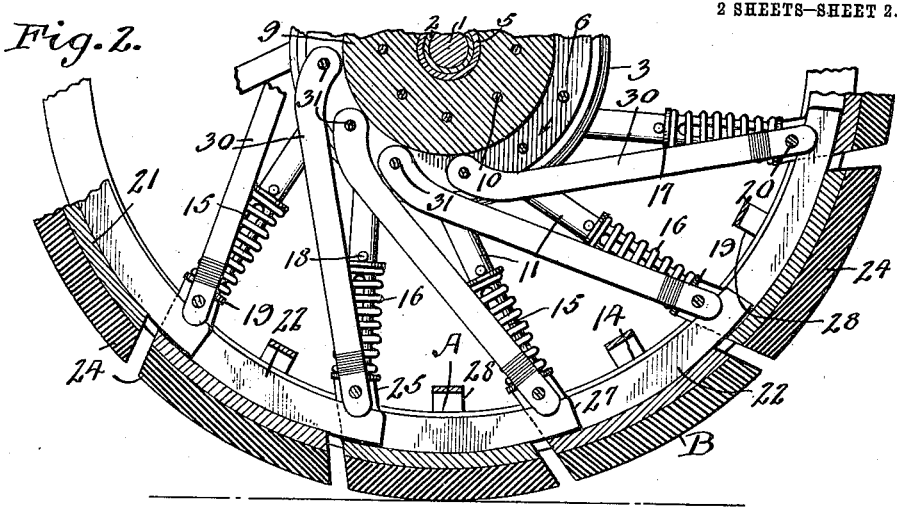
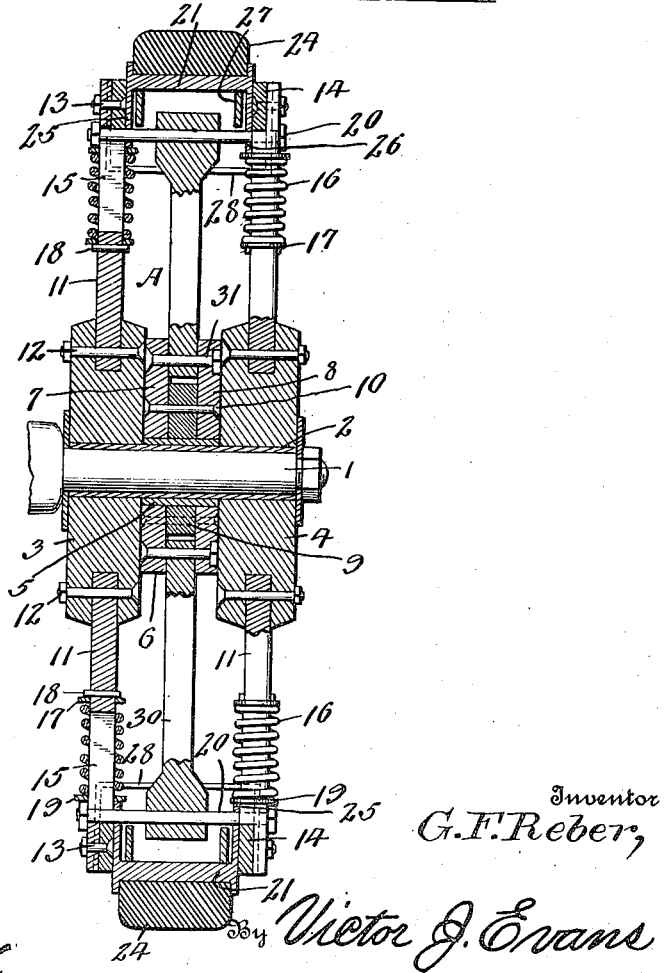

UNITED STATES PATENT OFFICE.

GEORGE FRANKLIN REBER, OF FENTON, IOWA.

VEHICLE-WHEEL.

1,129,729.

Specification of Letters Patent.

Patented Feb. 23, 1915.

Application filed June 19, 1914. Serial No. 846,171.

*To all whom it may concern:*

Be it known that I, GEORGE FRANKLIN REBER, a citizen of the United States, residing at Fenton, in the county of Kossuth and State of Iowa, have invented new and useful Improvements in Vehicle-Wheels, of which the following is a specification.

This invention relates to vehicle wheels, the object in view being to produce a cushioned wheel which will dispense with the necessity of using pneumatic tires and avoid all troubles incident thereto and at the same time absorb all ordinary road jars and shocks and prevent the transmission of the same to the axles and body of the vehicle.

The principal object of the present invention is to produce a wheel embodying an endless circular series of non-puncturable tire or tread sections, the same being yieldingly supported relatively to the wheel hub by cushioning devices which are simultaneously controlled by a common equalizer, the parts being so combined and arranged that when a load is imposed on one of the tire or tread sections, the cushioning devices of all of the sections will be simultaneously and equally acted upon so that they will all mutually contribute to the cushioning effect produced on any section of the tire or tread.

With the above and other objects in view, the invention consists in the novel construction, combination and arrangement of parts, as will be hereinafter more fully described, illustrated and claimed.

Figure 1:
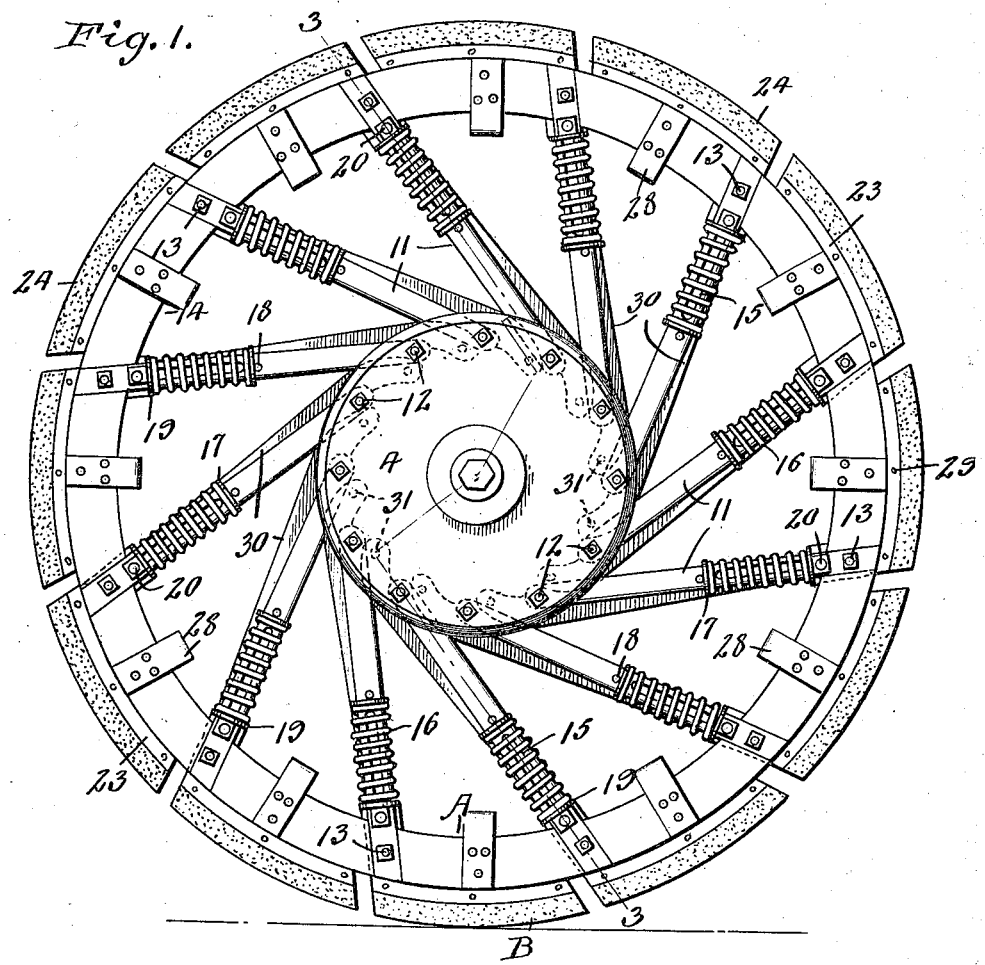
Figure 4:
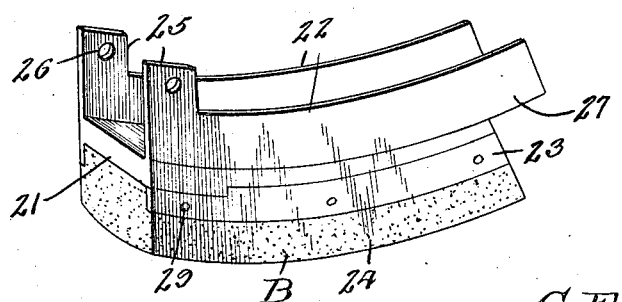

In the accompanying drawings:—Figure 1 is a side elevation of a vehicle wheel embodying the present invention. Fig. 2 is a longitudinal section through the lower half of the wheel. Fig. 3 is a diametrical cross section through the wheel. Fig. 4 is a detail perspective view of one of the tire or tread sections complete.

Referring to the drawings 1 designates an axle or spindle upon which the wheel is mounted, 2 a sleeve or skein surrounding said axle or spindle.

The hub proper comprises the two hub sections 3 and 4 spaced apart relatively to each other and held at a certain distance apart by means of a spacing thimble 5 in the form of a sleeve surrounding the sleeve 2 as shown in Fig. 3. Between the hub sections 3 and 4 is loosely mounted an oscillatory equalizer 6 which is shown for convenience as composed of two side disks 7 and 8 at opposite sides of an interposed spacing washer 9 to which the disks 7 and 8 are fixedly secured by means of bolts or rivets 10. The equalizer 6 does not rotate relatively to the hub but merely oscillates back and forth around the thimble 5 as a bearing.

Two oppositely arranged series of spokes 11 are bolted at their inner ends as shown at 12 to the hub sections 3 and 4 and their outer ends are bolted at 13 to the opposite ring-like sections 14 of a fixed rim designated generally at A. Each of the spokes 11 is formed with a longitudinal slot 15 therein and surrounded by a cushioning spring 16 forming the cushioning means for the wheel. Each spring 16 is confined between a washer 17 at its inner end bearing against a pin or stop 18 on the spoke and a washer 19 at its outer end slidable longitudinally of the spoke. Through each pair of oppositely arranged spokes is inserted a cross bar 20 shown in the form of a bolt or pin which is adapted to simultaneously compress the opposite pair of springs 16.

Connected to each of the cross bars 20 is a tire or tread section designated generally at B and one of which is shown in detail in Fig. 4, each tread or tire section comprising a felly section 21 provided with inwardly extending flanges 22 in spaced relation to each other, and tread section holding flanges 23 which embrace a tread section 24 of rubber or other suitable material. Each of the sections is provided with inwardly extending ears 25 formed with holes 26 to receive the adjacent cross bar 20 so that said tire section and cross bar move inwardly and outwardly together, both being supported by the cushioning springs 16. From the ears 25 the flanges 22 converge slightly toward their opposite ends and project beyond the end of the rubber tread 24 and the flanges 23 to form tongue-like projections 27 which overlap and fit between the flanges 22 of the adjacent tire section. The rubber section 24 is secured between the flanges 23 by means of bolts or rivets 29.

Extending from all of the cross bars 20 to the oscillatory equalizer 6 is a link or connecting rod 30, there being as many links or connecting rods as there are tire sections and half as many of said links or connecting rods as there are spokes 11. Each link 30 is journaled on the central portion of one of the cross bars 20 and is pivotally connected at its inner end to the equalizer as shown at 31. Therefore as the load is imposed on the lowermost section of the tire and said section moves toward the hub of the wheel, the link 30 of said section causes a partial rotation of the equalizer 6 and thereupon all of the links 30 are moved simultaneously and equally with the original link. In order to do this all of the cushioning springs 16 must be equally compressed and therefore all of said springs mutually contribute to support each tire section and cushion the inward movement thereof. As each cross bar 20 moves inwardly by reason of the action referred to, it acts on one pair of springs 16 immediately adjacent thereto as shown in Fig. 3. The outward movement of the sections is limited by the cross bars 20 coming in contact with the inner edge of the fixed rim A.

What I claim is:—

1. In a vehicle wheel, the combination of a hub, a fixed rim, spokes disposed at an angle to the radius of the wheel and connecting said hub and fixed rim, a circular series of tread sections movable toward and away from the hub, cushioning springs guided by said spokes, an oscillatory equalizer journaled on the hub, and links disposed at an angle to the radius of the wheel and connecting said tread sections with said equalizer and urged outwardly by said springs.

2. In a vehicle wheel, the combination with the hub thereof, of a circular series of tread sections, cushioning means for said tread sections, an equalizer mounted to oscillate around the axis of the wheel, and links disposed at an angle to the radius of the wheel and connecting said tread sections with said equalizer and urged outwardly by said springs.

3. In a vehicle wheel, the combination of a hub, a fixed rim, two circular series of spokes disposed at an angle to the radius of the wheel and connecting said hub and fixed rim, a circular series of tread sections movable toward and away from the hub, cushioning springs guided by said spokes, an oscillatory equalizer journaled on the hub, and links disposed at an angle to the radius of the wheel and connecting said tread sections with said equalizer and urged outwardly by said springs.

4. In a vehicle wheel, the combination with the hub thereof, of a circular series of tread sections, cushioning means for said tread sections, an equalizer mounted to oscillate around the axis of the wheel, and links disposed at an angle to the radius of the wheel and connecting said tread sections with said equalizer and adapted when one tread section is pressed inwardly to effect a corresponding movement of the remaining tread sections.

5. In a vehicle wheel, the combination of a hub, a fixed rim, spokes disposed at an angle to the radius of the wheel and connecting said hub and fixed rim, a circular series of tread sections movable toward and away from the hub and bearing an overlapping relation to each other, cushioning springs guided by said spokes, an oscillatory equalizer journaled on the hub, and links disposed at an angle to the radius of the wheel and connecting said tread sections with said equalizer and urged outwardly by said springs.

6. In a vehicle wheel, the combination of a hub, a fixed rim, spokes disposed at an angle to the radius of the wheel and connecting said hub and fixed rim and formed with longitudinal slots therein, oppositely arranged series of springs guided by said spokes, a circular series of tread sections supported by said spokes, an equalizer journaled to turn on the axis of the wheel, links disposed at an angle to the radius of the wheel and connecting the tread sections with said equalizer, and cross bars connecting said links with the tread sections.

7. In a vehicle wheel, the combination of a hub, a fixed rim, spokes connecting said hub and fixed rim and formed with longitudinal slots therein, springs guided by said spokes, a circular series of tread sections supported by said spokes, an equalizer journaled to turn on the axis of the wheel, links connecting the tread sections with said equalizer, and cross bars connecting said links with the tread sections, said hub embodying relatively spaced portions between which said equalizer is loosely confined.

In testimony whereof I affix my signature in presence of two witnesses.

GEORGE FRANKLIN REBER.

Witnesses:
E. S. AELING,
E. C. WEISBROD.